(12) United States Patent
Lin

(10) Patent No.: US 9,667,067 B2
(45) Date of Patent: May 30, 2017

(54) ELECTRIC POWER SOCKET CONTROL SYSTEM

(71) Applicant: Chia-Hua Lin, New Taipei (TW)

(72) Inventor: Chia-Hua Lin, New Taipei (TW)

(*) Notice: Subject to any disclaimer, the term of this patent is extended or adjusted under 35 U.S.C. 154(b) by 372 days.

(21) Appl. No.: 14/580,718

(22) Filed: Dec. 23, 2014

(65) Prior Publication Data

US 2016/0181805 A1 Jun. 23, 2016

(51) Int. Cl.
*H02J 3/00* (2006.01)
*H04W 4/00* (2009.01)

(52) U.S. Cl.
CPC ............. *H02J 3/005* (2013.01); *H04W 4/008* (2013.01)

(58) Field of Classification Search
CPC ................................ H02J 3/005; H04W 4/008
See application file for complete search history.

(56) References Cited

U.S. PATENT DOCUMENTS

| | | | |
|---|---|---|---|
| 2007/0203860 A1* | 8/2007 | Golden ................. | G06Q 10/04 705/412 |
| 2008/0019067 A1* | 1/2008 | Reynolds ............... | G06F 1/266 361/93.1 |
| 2014/0098247 A1* | 4/2014 | Rao ....................... | H04W 4/20 348/207.1 |

* cited by examiner

*Primary Examiner* — Kenneth M Lo
*Assistant Examiner* — David Wynne
(74) *Attorney, Agent, or Firm* — Muncy, Geissler, Olds & Lowe, P.C.

(57) ABSTRACT

An electric power socket control system comprises a cloud server, a wireless network sharer, at least an electric power socket device including a wireless network interface circuit and an electric quantity detection circuit, and a handheld device, wherein the electric power socket device can connect to the cloud server through the wireless network of the wireless network sharer and receive instructions for controlling the electric power socket device via the cloud server. In addition, the handheld device includes a built-in control software allowing to connect to the cloud server, in which the control software can be used to build the basic data of the electric power socket device and further select that, during a time interval, the system can perform power supply/power break operations to the electric power socket device automatically and randomly at non-fixed time.

10 Claims, 30 Drawing Sheets

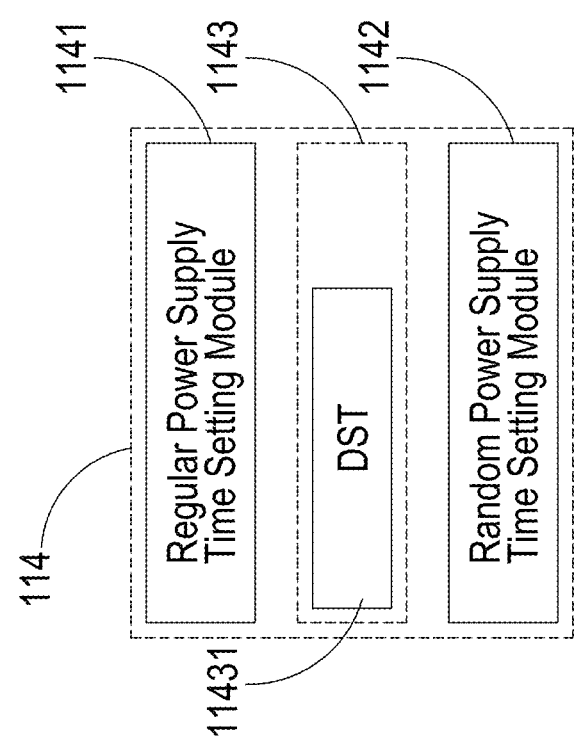

☐ Back

☑ USA    ☑ Canada

Zip Code    xxxxx
Alias:      xxxxx
SSID:       xxxxx
Password:   xxxxx

*FIG.5A*

| Back | Light@room | | | | DONE |
|---|---|---|---|---|---|
| | ON | | | | |
| Mon | Dec | 15 | 3 | 04 | |
| Tue | Dec | 16 | 4 | 05 | AM |
| | Today | | 5 | 06 | PM |
| Thu | Dec | 18 | 6 | 07 | |
| Fri | Dec | 20 | 7 | 08 | |
| | OFF | | | | |
| Mon | Dec | 15 | 5 | 04 | |
| Tue | Dec | 16 | 6 | 05 | AM |
| | Today | | 7 | 06 | PM |
| Thu | Dec | 18 | 8 | 07 | |
| Fri | Dec | 20 | 9 | 08 | |

Light@room

Holiday Random

☑ Night:6pm~11pm

☑ Day:9am~11pm

☑ 24 Hour:12am~12pm

*FIG.7G*

| Back | Light@room | DONE |

Security Random. ON

| Mon | Dec | 15 | 3 | 04 |    |
|-----|-----|----|----|----|----|
| Tue | Dec | 16 | 4 | 05 | AM |
|     | Today |  | 5 | 06 | PM |
| Thu | Dec | 18 | 6 | 07 |    |
| Fri | Dec | 20 | 7 | 08 |    |

Security Random. OFF

| Mon | Dec | 15 | 5 | 04 |    |
|-----|-----|----|----|----|----|
| Tue | Dec | 16 | 6 | 05 | AM |
|     | Today |  | 7 | 06 | PM |
| Thu | Dec | 18 | 8 | 07 |    |
| Fri | Dec | 20 | 9 | 08 |    |

*FIG. 7H*

| Back | Light@room |
|---|---|

1350W

Select Electric Fee
- ☑ Residential
- ☑ Commercial
- ☑ Business
- ☑ Default _ _ _ _ form Sep 17 to Now

Electric Bill  $25.32
Now Price    $20.75    (cents/kwh)
Power Factor 0.75 pF

*FIG.8C*

ELECTRIC POWER SOCKET CONTROL SYSTEM

BACKGROUND OF THE INVENTION

1. Field of the Invention

The present invention generally relates to an electric power socket control system; in particular, it relates to an electric power socket control system allowing power supply/power break to an electric power socket device during a time interval chosen by a user or otherwise automatically and randomly at non-fixed time.

2. Description of Related Art

For the electric power socket, a user can typically plug an electric device to an electric power socket, and since users mostly stay indoors, it is very common to manually control the start or shutdown of the electric device. This control approach may work very well if the user stays indoors; however, suppose the user is currently outdoors, it may be inapplicable to turn on or off the electric device in this way.

To address the aforementioned issues, there are vendors providing a kind of software capable of turning on an electric device remotely such that a user can start an electric device from a remote location; meanwhile, with regards to the electric power socket, other vendors design a sort of mechanism capable of configuring power supply and power break operations within a certain duration of time. Unfortunately, this type of software my exhibit a drawback; that is, it is not possible to adjust in terms of countries and areas, and since time settings for different countries and areas vary, the mechanism for controlling the power supply and power break operations may generate errors if changes can not be made in accordance with different countries and areas.

Moreover, if the user needs to leave for a duration of time, e.g., due to vacation or other reasons, although it is possible to configure to turn on/off the indoor electric devices within a certain period, it is still too regular and usually not be able to provide the anti-theft effect, which also indicates a significant defect.

Consequently, the present invention would be an optimal solution if it is possible to, by means of the software installed on a handheld device, allow a user to perform power supply/power break operations to the electric power socket device automatically and randomly at non-fixed time within a selected time interval, and also to input the zip code of a different area so as to control the power supply/power break operations to the electric power socket device in conjunction with the data of that area.

SUMMARY OF THE INVENTION

The present invention relates to an electric power socket control system which allows a user to, by means of a software installed on a handheld device, perform power supply/power break operations of an electric power socket device within a selected time interval or otherwise automatically and randomly at non-fixed time, and also to input the zip code of different areas thereby controlling power supply/power break operations of the electric power socket device in conjunction with the data for that area.

An electric power socket control system, comprising: a cloud server, including a built-in database module; a wireless network sharer, used to provide a wireless network capable of connecting to external networks; at least an electric power socket device, which includes a wireless network interface circuit and an electric quantity detection circuit, and is able to connect to the wireless network sharer by means of the wireless network interface circuit so as to connect to the cloud server through the wireless network of the wireless network sharer and receive instructions for controlling the electric power socket device via the cloud server; a handheld device, having a build-in control software for connections to the cloud server, the control software including: an operation interface unit, used to provide multiple user interfaces in order to operate the control software on different user interfaces; a wireless connection unit, connected to the operation interface unit such that the control software connects to the electric power socket device on a wireless connection interface, thereby, after connection, allowing to enter into a main page operation interface to perform settings on different items; a control mode building unit, connected to the main page operation interface and the operation interface unit, in which the control mode building unit can configure the basic data of the electric power socket device on a control mode building interface, the control mode building unit including: a name input module, used to input a name defining the electric power socket device; a connection mode selection module, allowing to select the connection mode between the control software in the handheld device and the electric power socket device; a country selection module, allowing to select the country where the electric power socket device is located; a zip code input module, used to input the zip code of the area in the country where the electric power socket device is located; an icon display module, capable of forming a control switch module on the main page operation interface, in which the control switch module shows the name and connection mode of the electric power socket device, and, in addition, the power supply status and electric power consumption quantity status of the electric power socket device can be uploaded to the database module of the cloud server, the power supply status of the electric power socket device can be displayed on the control switch module in real-time, and the control switch module can be pressed down so that the press-down status can be uploaded to the cloud server in order to change the power supply status of the electric power socket device in real-time; a power supply time switch selection unit, connected to the main page operation interface and the operation interface unit, in which the power supply time switch selection unit can set up the power supply time data of the electric power socket device on a power supply time selection interface, the power supply time switch selection unit including: a regular power supply time setting module, used to set up the power supply and power break times of the electric power socket device in any days, in which the regular power supply time setting module can form a regular power supply start module on the power supply time selection interface so that the regular power supply start module can be pressed down in order to initiate setting operations; a random power supply time setting module, used to select or input the control time interval of the electric power socket device for each day and perform random power supply or power break operations within the control time interval, in which the random power supply time selection module can form a random power supply start module on the power supply time selection interface so that the random power supply start module can be pressed down in order to initiate setting operations; a sunrise/sunset power supply selection module, in which the sunrise/sunset power supply selection module can set up the sunrise/sunset power supply data of the electric power socket device on a sunrise/sunset power supply selection interface and can be used to configure whether to perform power supply/power break operations of the electric power socket device in each day; a data upload unit, connected to the control mode building unit, the power supply time switch selection unit and the sunrise/sunset power selection unit, and used to upload the basic data, power supply time data and the sunrise/sunset power supply data of the electric power socket device to the database module of the cloud server and generate a data file with the basic data of the electric power socket device such that the power supply status and the electric power consumption quantity status uploaded by the electric power socket device can be stored in the data file; an electric power consumption quantity display unit, connected to the main page operation interface and the operation interface unit and capable of configuring and displaying the electric power consumption data of the electric power socket device on an electric power consumption quantity display interface, the electric power consumption quantity display unit including: an electricity charge collection method setting module, used to configure the electricity charge collection mode for the electric power socket device; an electricity charge collection time setting module, used to configure the time range of the electricity charge collection for the electric power socket device; a real-time electric power consumption quantity display module, capable of accessing the electric power consumption quantity status of the electric power socket device from the database module of the cloud server and displaying the electric power consumption quantity on the electric power consumption quantity display interface with different colors in accordance with the electric power consumption quantity data; and a real-time electricity charge display module, capable of calculating the electricity charge amount in accordance with the electric power consumption quantity status, the electricity charge collection mode and the time range for electricity charge collection, and displaying the amount on the electric power consumption quantity display interface.

More specifically, the connection mode between the control software in the handheld device and the electric power socket device is of a remote control mode and a direct control mode, in which the remote control mode indicates that the handheld device needs to transfer power supply/power break instructions to the electric power socket device through the cloud server, and the direct control mode means the handheld device transfers power supply/power break instructions to the electric power socket device directly by way of the wireless network.

More specifically, if the electric power socket device is connected to the cloud server, then the control switch module of the electric power socket device can be displayed on the main page operation interface, and if the electric power socket device is not connected to the cloud server, then the control switch module can not be pressed down to control power supply/power break operations to the electric power socket device.

More specifically, the control software can configure with respect to different electric power socket devices and generate different control switch modules, and different control switch modules displayed on the main page operation interface can be shown with sliding and moving actions.

More specifically, the database module of the cloud server further comprises the sunrise/sunset standard data corresponding to different counties and zip codes such that the cloud server can calculate based on the configured sunrise/sunset power supply data in conjunction with the sunrise/sunset standard data and transfers power supply/power break instructions to the electric power socket device.

More specifically, the database module of the cloud server further comprises the electricity charge standard data corresponding to different counties and zip codes such that the cloud server can calculate the electricity charge amount based on the configured electric power consumption data in conjunction with the electricity charge standard data and transfer it to the control software of the handheld device thereby displaying the electric power consumption quantity power supply/power break instructions on the electric power consumption quantity display interface.

More specifically, it further includes an electric power socket name modification unit connected to the main page operation interface and the operation interface unit, in which the setting modification module is used to modify the configured electric power socket name.

More specifically, the sunrise/sunset power supply selection module further includes a daylight saving time power supply setting module, in which the daylight saving time power supply setting module sets up the power supply/power break time of the electric power socket device in each day based on the daylight saving time, and the daylight saving time power supply setting module can form a daylight saving time power supply start module on the sunrise/sunset power supply selection interface so the daylight saving time power supply start module can be pressed down to initiate setting operations.

More specifically, the cloud server can calculate the power factor based on the electric power consumption status of the electric power socket device and transfer it to the control software of the handheld device so as to be displayed on the electric power consumption quantity display interface.

More specifically, the regular power supply time setting module further includes interfaces such as Countdown Timer (countdown timer for power supply and power break time), Programmable Timer (regular power supply time setting), Astronomic Time (sunrise/sunset power supply and power break time), Holiday Random (power supply time on holiday) etc.

BRIEF DESCRIPTION OF THE DRAWINGS

FIG. 2C shows an internal architecture diagram for the power supply time switch selection unit of the electric power socket control system according to the present invention.

FIG. 5A shows an implementation diagram of the basic data setting for the electric power socket control system according to the present invention.

FIG. 7D shows an implementation diagram of the power supply time setting for the electric power socket control system according to the present invention.

FIG. 7F shows an implementation diagram of the power supply time setting for the electric power socket control system according to the present invention.

FIG. 7G shows an implementation diagram of the power supply time setting for the electric power socket control system according to the present invention.

FIG. 7H shows an implementation diagram of the power supply time setting for the electric power socket control system according to the present invention.

FIG. 8C shows an implementation diagram of the electric power consumption quantity and electricity charge presentation for the electric power socket control system according to the present invention.

DETAILED DESCRIPTION OF THE PREFERRED EMBODIMENTS

Other technical contents, aspects and effects in relation to the present invention can be clearly appreciated through the detailed descriptions concerning the preferred embodiments of the present invention in conjunction with the appended drawings.

Figure 1:
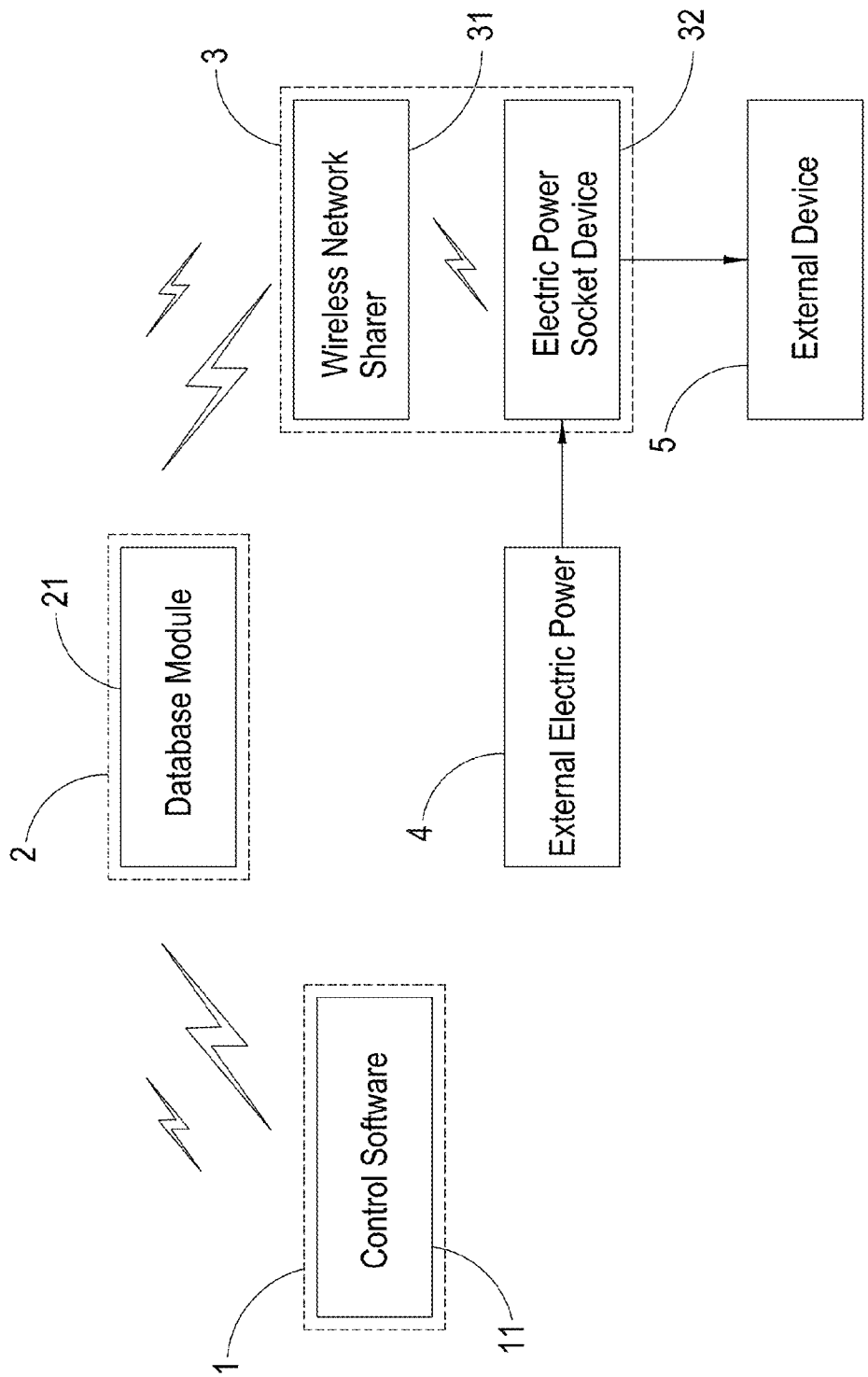
FIG. 1 shows an overall architecture diagram for the electric power socket control system according to the present invention.

Refer initially to FIG. 1, wherein an overall architecture diagram for the electric power socket control system according to the present invention is shown. It can be seen from the Figure that the electric power socket control system comprises a handheld device 1, a cloud server 2 having a database module 21, a wireless network sharer 31 installed indoors 3 and an electric power socket device 32, wherein the electric power socket device 32 can connect to the cloud server 2 by way of the wireless network of the wireless network sharer 31 and receive instructions controlling the electric power socket device 32 through the cloud server 2; in addition, the handheld device 1 further includes a built-in control software 11 enabling connections to the cloud server 2.

Figure 2A:
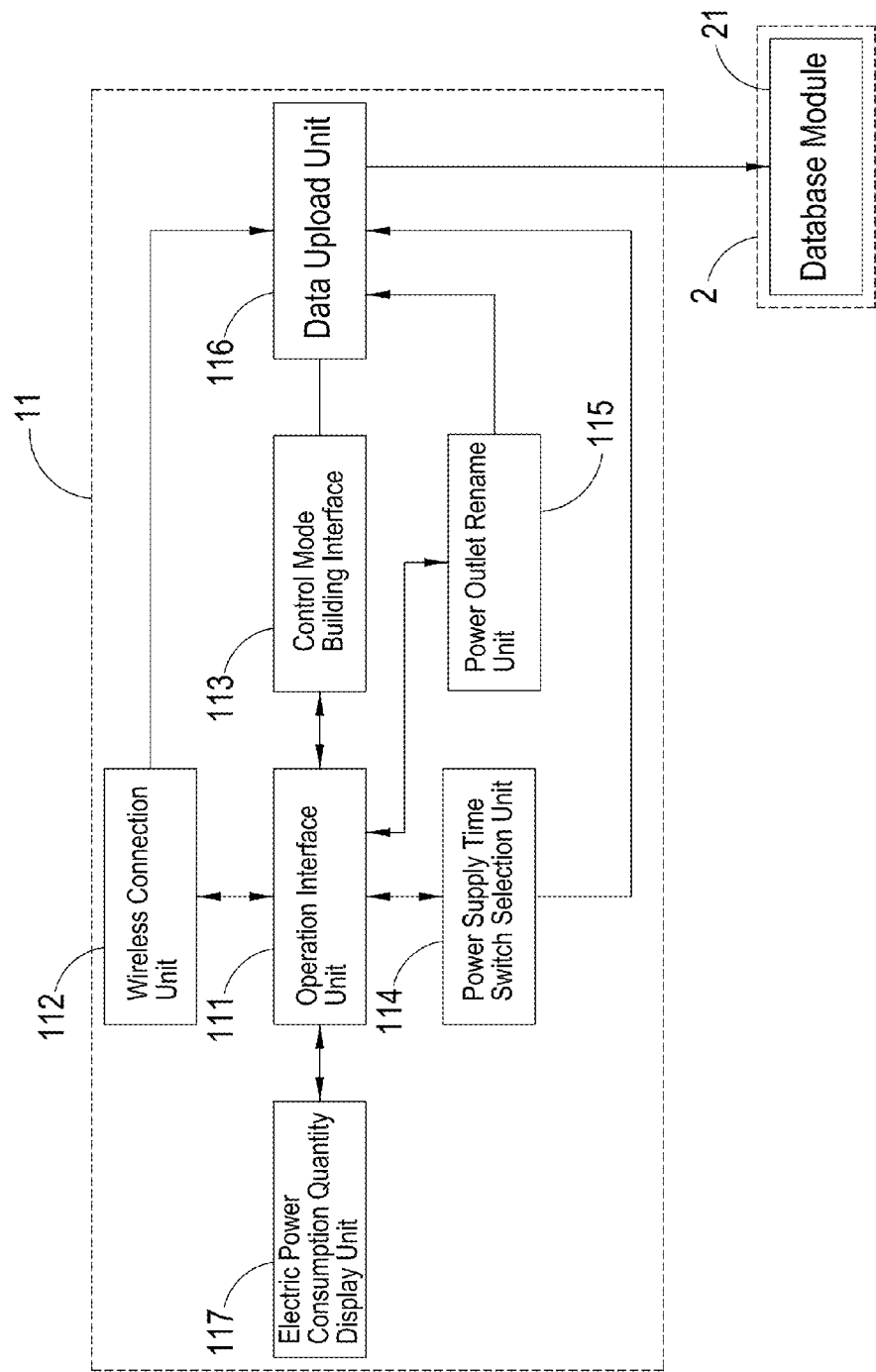
FIG. 2A shows an internal architecture diagram for the control software of the electric power socket control system according to the present invention.

Moreover, it is shown in FIG. 2A that the control software 11 comprises an operation interface unit 111, a wireless connection unit 112, a control mode building unit 113, a power supply time switch selection unit 114, an electric power socket name modification unit 115, a data upload unit 116 and an electric power consumption quantity display unit 117, wherein the operation interface unit 111 can be used to provide multiple user interfaces and the wireless connection unit 112 allows the control software 11 to connect to the electric power socket device 32.

Figure 2B:
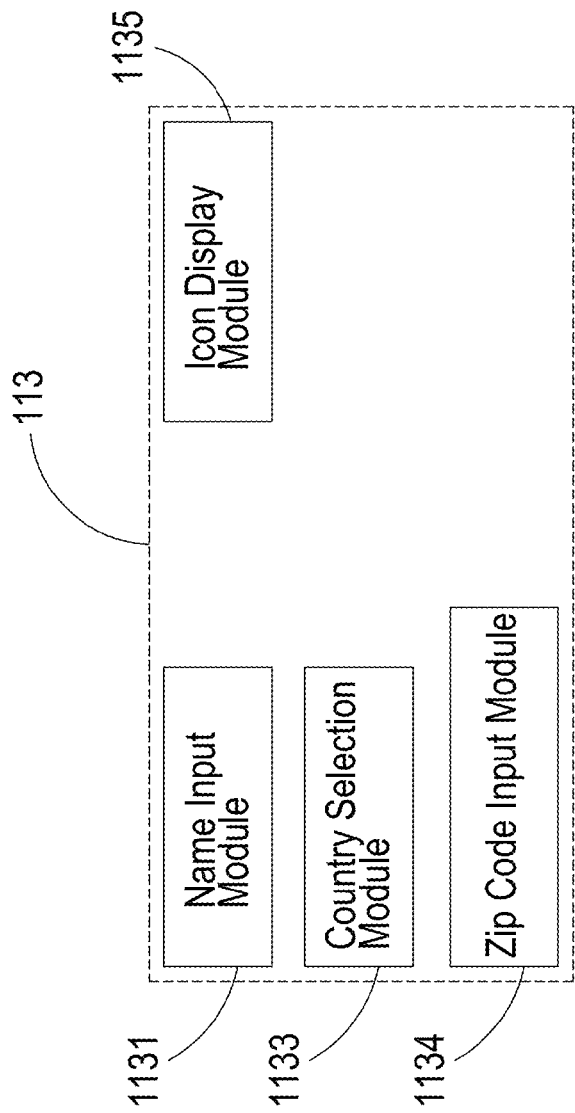
FIG. 2B shows an internal architecture diagram for the control mode building unit of the electric power socket control system according to the present invention.
Figure 2D:
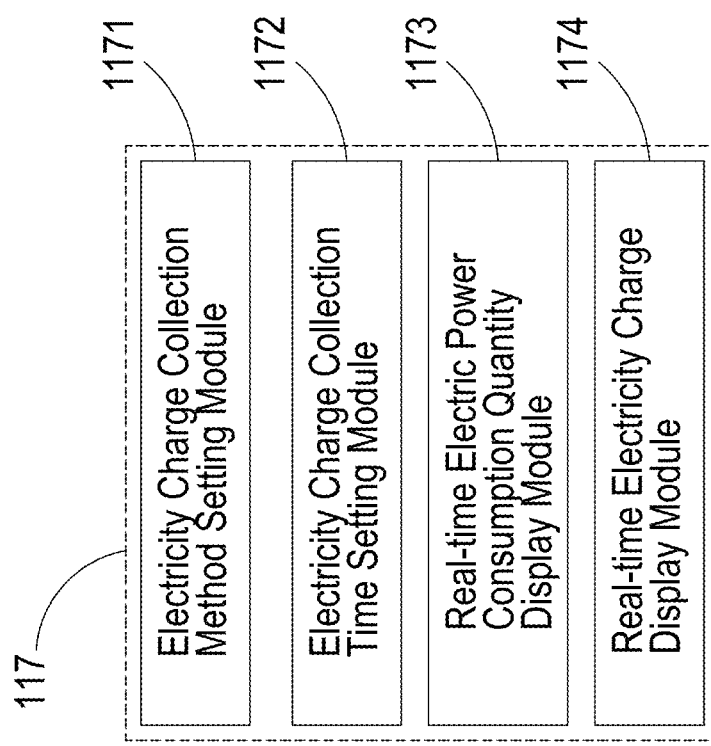
FIG. 2D shows an internal architecture diagram for the electric power consumption quantity display unit of the electric power socket control system according to the present invention.

The control mode building unit 113 can build and configure the basic data controlling the electric power socket device 32 on a control mode building interface. From FIG. 2B, it can be seen that the control mode building unit 113 includes a name input module 1131, a country selection module 1133, a zip code input module 1134 and an icon display module 1135, thereby, through the aforementioned modules, building and configuring the name, connection mode, the zip code corresponding to the area of the country where it is located, of the electric power socket device. Besides, having completed the basic data building operation, the icon display module 1135 can further form a control switch module on the main page operation interface such that the name of the electric power socket device is shown on the control switch module. Additionally, the power supply status of the electric power socket device 32 can be displayed in real-time on the control switch module, and the control switch module can be pressed down so that the press-down status can be uploaded to the cloud server 2 in order to change the power supply status of the electric power socket device 32 in real-time.

The power supply time switch selection unit 114 can configure the power supply time data of the electric power socket device 32 on a power supply time selection interface. From FIG. 2C, it can be appreciated that the power supply time switch selection unit 114 includes a regular power supply time setting module 1141, a sunrise/sunset power supply selection module 1143 and a random power supply time setting module 1142, wherein the regular power supply time setting module 1141 can set up the power supply and power break times of the electric power socket device 32 of any day, and the random power supply time setting module 1142 can select or input the control time interval of the electric power socket device 32 for each day and randomly perform power supply or power break operations within the control time interval. Moreover, the regular power supply time setting module 1141 and the random power supply time setting module 1142 can respectively form a regular power supply start module and a random power supply start module thereby allowing to press down thereon in order to initiate the aforementioned settings.

The sunrise/sunset power supply selection module 1143 can configure the sunrise/sunset power supply data of the electric power socket device 32 on a sunrise/sunset power supply selection interface. The sunrise/sunset power supply selection module 1143 includes a daylight saving time power supply setting module 11431, wherein the sunrise/sunset power supply selection module 1143 configures whether sunrise/sunset power supply and power break operations of each day should be performed to the electric power socket device 32; meanwhile, the daylight saving time power supply setting module 11431 sets up power supply and power break times of the electric power socket device 32 for each day based on the daylight saving time, and the daylight saving time power supply setting module 11431 can further form a daylight saving time power supply start module on the sunrise/sunset power supply selection interface for pressing down thereon to initiate the settings.

The data upload unit 116 can upload the basic data, power supply time data as well as sunrise/sunset power supply data of the electric power socket device 32 to the database module 21 of the cloud server 2, and the basic data of the electric power socket device 32 can be used to create a data file such that the power supply status and electric power consumption status uploaded by the electric power socket device 32 can be stored in this data file.

The electric power consumption quantity display unit 117 can configure and display the electric power consumption data of the electric power socket device on an electric power consumption quantity display interface. From FIG. 2E, it can be seen that the electric power consumption quantity display unit 117 includes an electricity charge collection method setting module 1171, an electricity charge collection time setting module 1172, a real-time electric power consumption quantity display module 1173 and a real-time electricity charge display module 1174, wherein the electricity charge collection method setting module 1171 and the electricity charge collection time setting module 1172 can be applied to set up the electricity charge collection mode and the time range of the electricity charge collection, and the real-time electric power consumption quantity display module 1173 and the real-time electricity charge display module 1174 can display the electric power consumption quantity data and the electricity charge amount on the electric power consumption quantity display interface in accordance with configured data.

Figure 3:
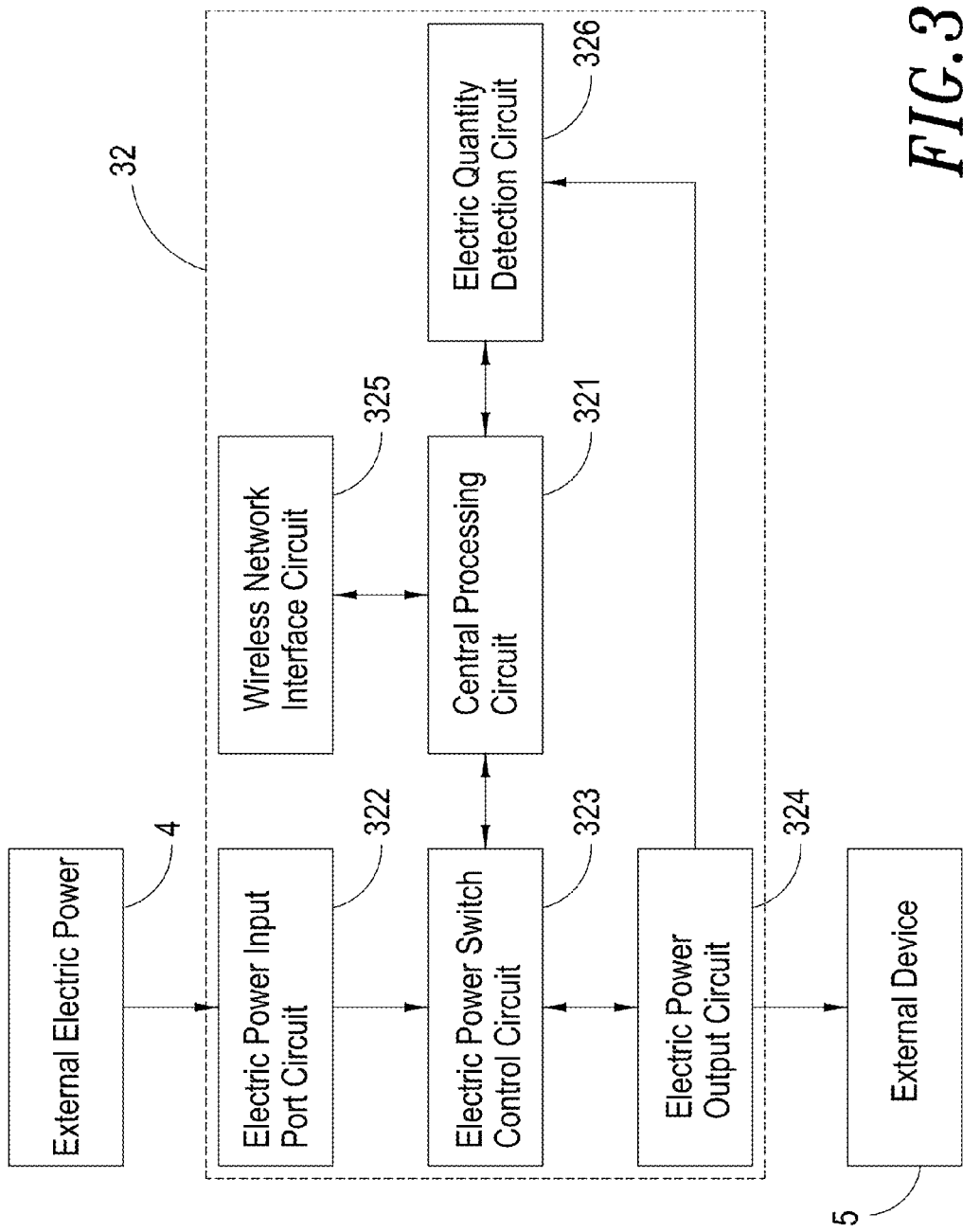
FIG. 3 shows an internal architecture diagram for the electric power socket device of the electric power socket control system according to the present invention.

Next, from FIG. 3, it can be seen that the electric power socket device 32 comprises a central processing circuit 321, an electric power input port circuit 322, an electric power switch control circuit 323, an electric power output circuit 324, a wireless network interface circuit 325 and an electric quantity detection circuit 326. Herein the electric power input port circuit 322 is connected to an external electric power 4; in other word, upon connecting the electric power socket device 32 to the external electric power 4, electric power can be conducted into the electric power input port circuit 322 so the central processing circuit 321 can control the electric power switch control circuit 323 to determine whether it is possible to transfer electric power to the electric power output circuit 324 in order to output electric power to the external electric power 5 (the outputted electric quantity is detected by the electric quantity detection circuit 326 and the detected electric quantity data can be transferred to the central processing circuit 321.) The central processing circuit 321 can be connected to the wireless network sharer through the wireless network interface circuit 325 so as to receive the instructions transferred by the cloud server 2 for controlling the electric power socket device 32 and then upload the power supply status and electric power consumption quantity status of the electric power socket device 32 to the cloud server 2.

Figure 4A:
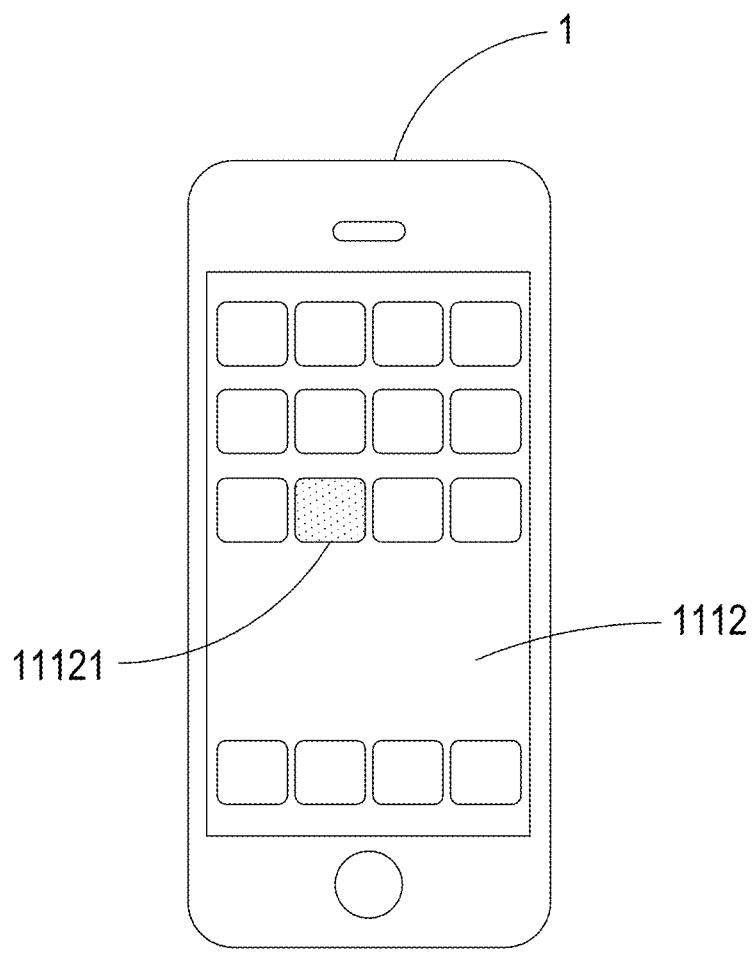
FIG. 4A shows an implementation diagram of the connection setting for the electric power socket control system according to the present invention.
Figure 4B:
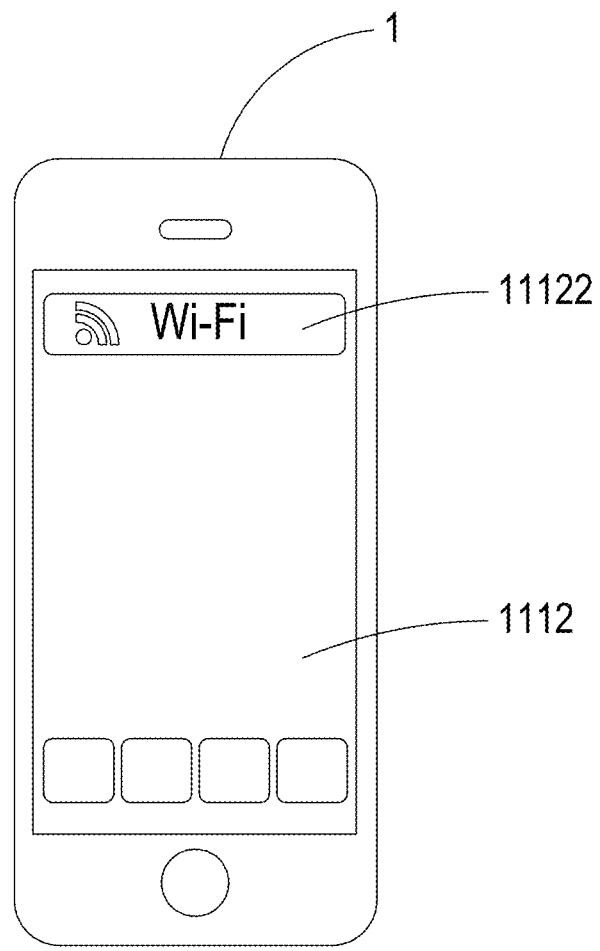
FIG. 4B shows an implementation diagram of the connection setting for the electric power socket control system according to the present invention.
Figure 4C:
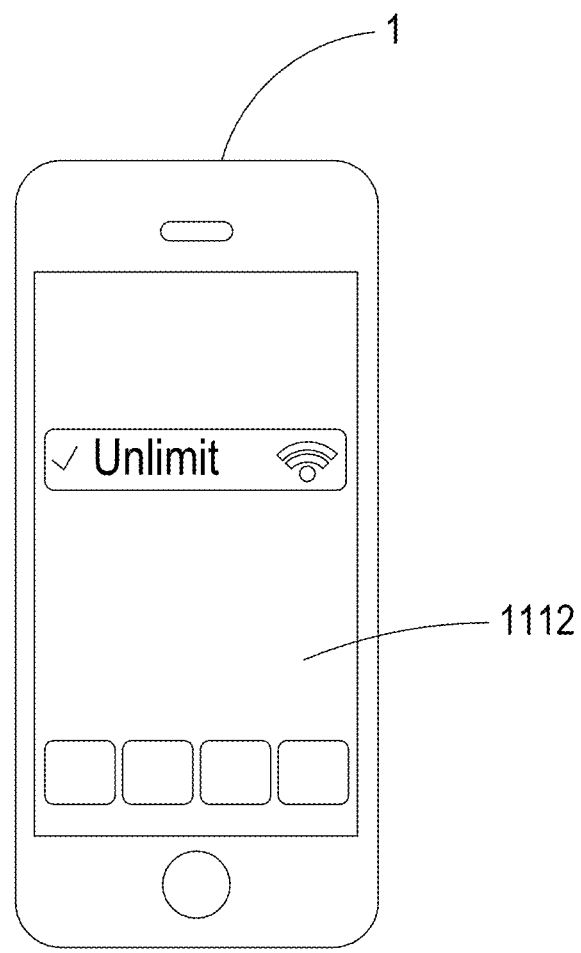
FIG. 4C shows an implementation diagram of the connection setting for the electric power socket control system according to the present invention.
Figure 4D:
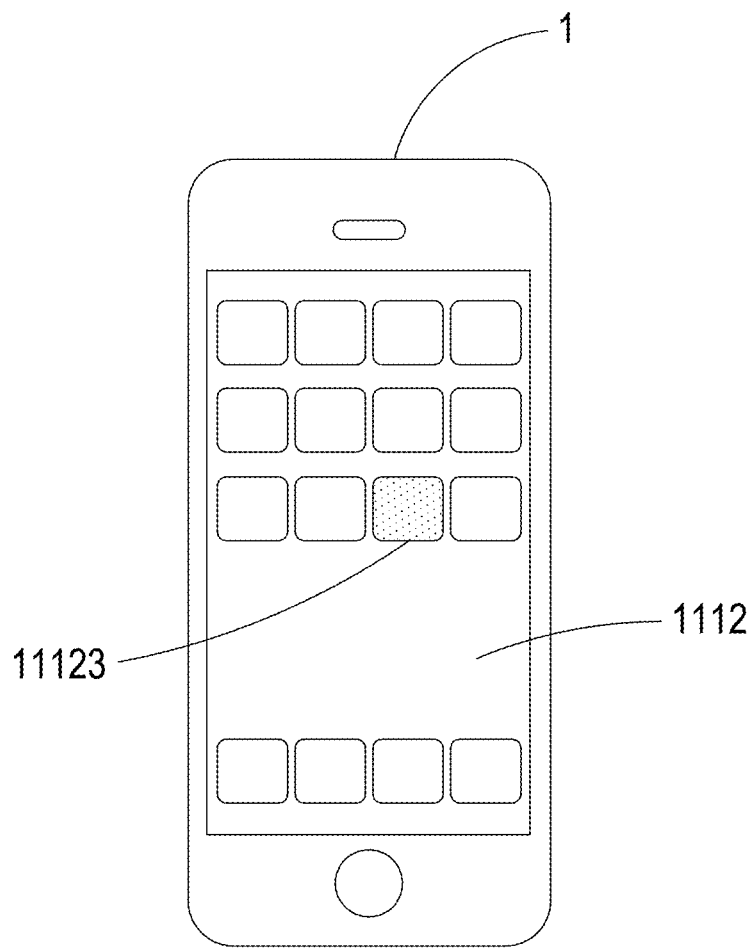
FIG. 4D shows an implementation diagram of the connection setting for the electric power socket control system according to the present invention.

FIGS. 4A~4D illustrate the implementation diagram of the connection setting according to the present invention. When a user plugs the electric power socket device 32 into an external electric power 4, the user can open the control software 11 which presents an operation interface 1112. In FIG. 4A, it shows that the user can first press down the start module 11121, then, in FIG. 4B, press down the connection module 11122, and as shown in FIG. 4C, the user can select WIFI for connection, thus that the wireless connection unit 113 begins to search nearby WIFI devices. After having affirmatively found the electric power socket device 32, it is possible to select the operation icon 11123 to enter into a control mode building interface 1113 to perform the next setting.

As shown in FIG. 5A, on the control mode building interface 1113, the remote control mode indicates that the handheld device 1 needs to go through the cloud server 2 to transfer power supply/power break instructions to the electric power socket device 32, and the direct control mode means the handheld device 1 can transfer power supply/power break instructions to the electric power socket device 32 directly by way of the wireless network; the user needs to input once again the name defining the electric power socket device 32.

Figure 5B:
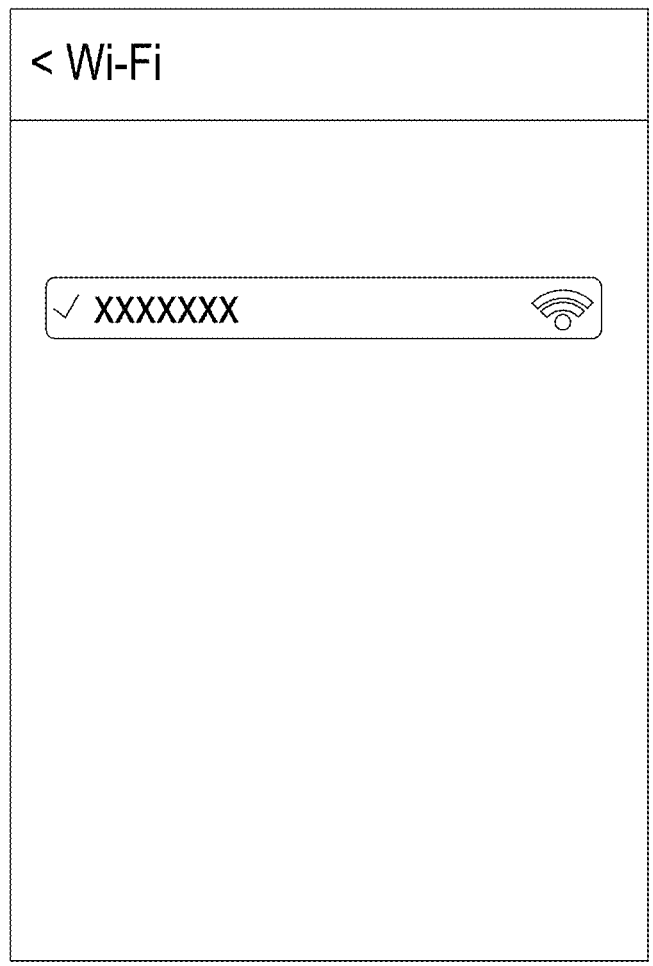
FIG. 5B shows an implementation diagram of the basic data setting for the electric power socket control system according to the present invention.
Figure 5C:
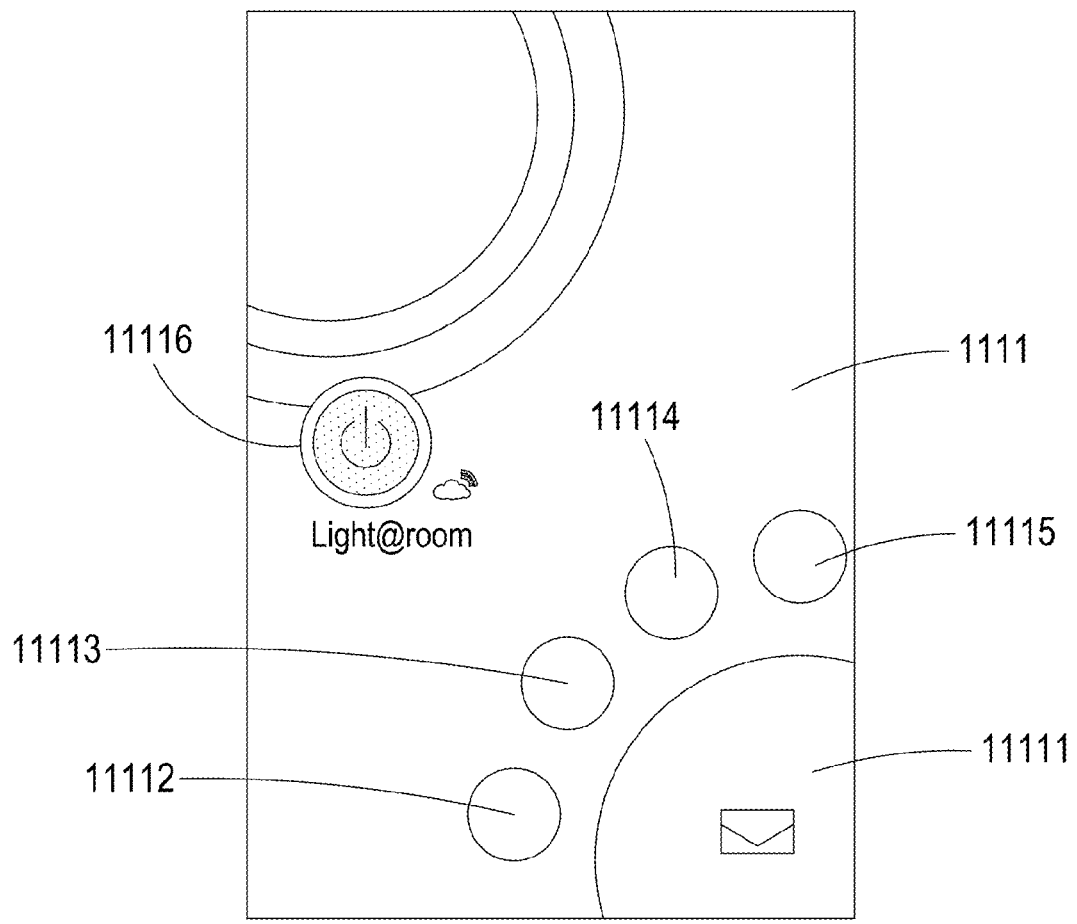
FIG. 5C shows an implementation diagram of the basic data setting for the electric power socket control system according to the present invention.

Afterward, on the control mode building interface 1113, the user can select the country and zip code in which the electric power socket device 32 is located or otherwise a password. After having entered such data, it enters into the Wi-Fi connection interface as shown in FIG. 5B. From FIG. 5C, it can appreciated that the icon display module 1135 can form a control switch module 11116 on the main page operation interface 1111. The control switch module 11116 shows the name and connection mode of the electric power socket device 32. Also, since the power supply status and electric power consumption quantity of the electric power socket device 32 can be uploaded to the database module 21 of the cloud server 2, the power supply status of the electric power socket device 32 can displayed on the control switch module 11116 in real-time, and the control switch module 11116 can be pressed down in order to start power supply, uploading the press-down status to the cloud server 2 and thus changing the power supply status of the electric power socket device 32 in real-time.

Figure 5D:
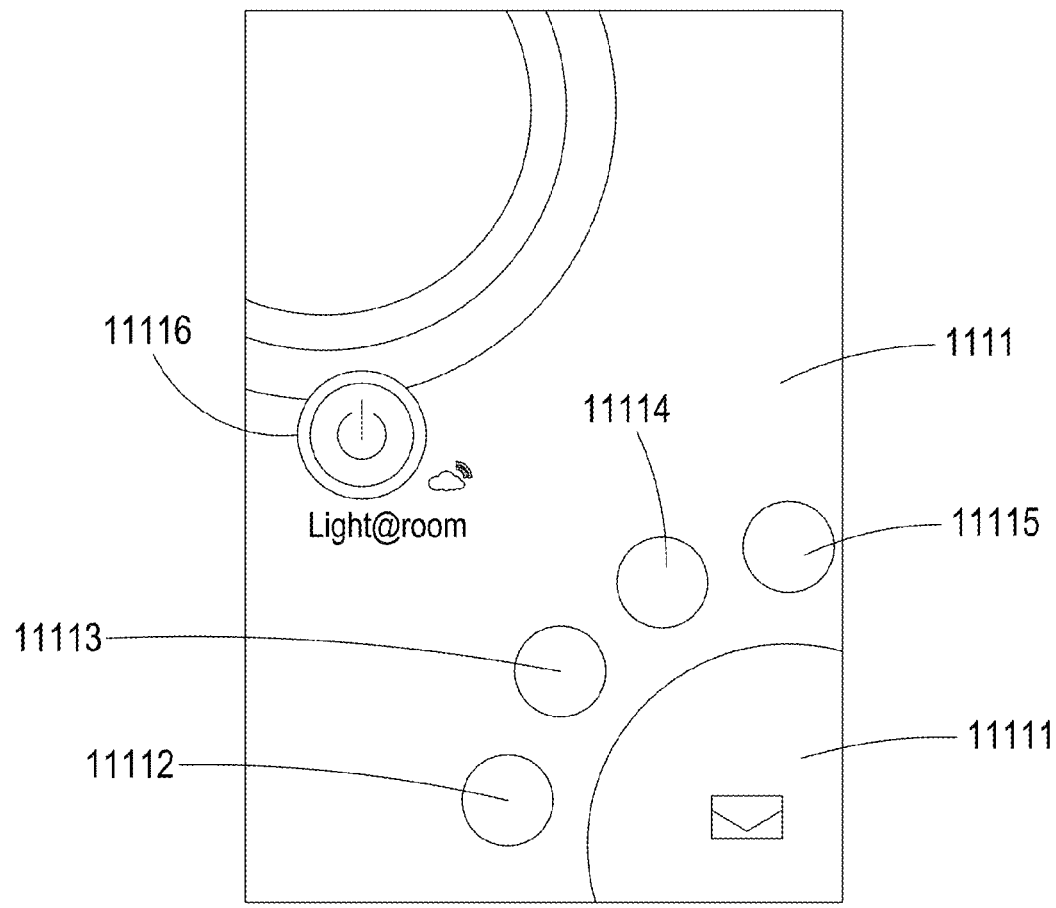
FIG. 5D shows an implementation diagram of the basic data setting for the electric power socket control system according to the present invention.
Figure 5E:
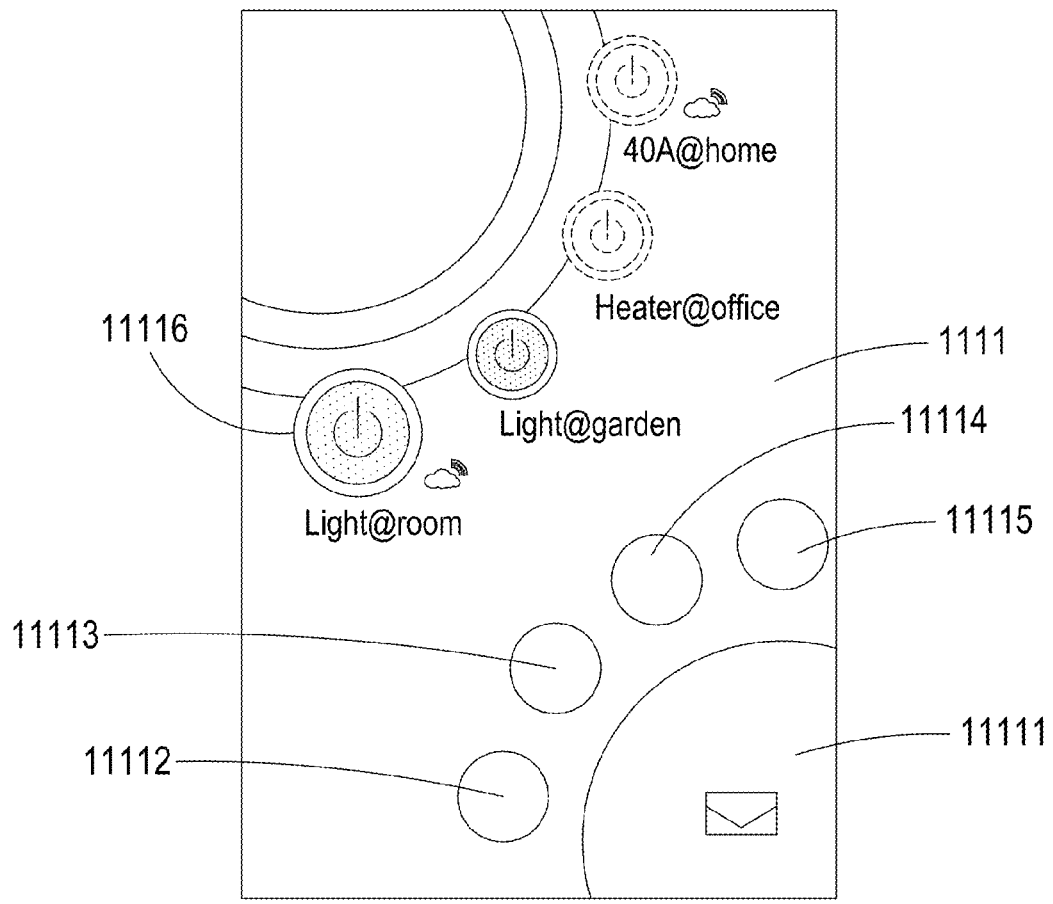
FIG. 5E shows an implementation diagram of the basic data setting for the electric power socket control system according to the present invention.

Moreover, from FIG. 5D, it can be understood that the user can once again press down the control switch module 11116 so that the control switch module 11116 becomes dark, which also means the control switch module 11116 is performing the power break operation. However, suppose the electric power socket device 32 can not connect to the cloud server 2, as shown in FIG. 5E, the control switch module 11116 has created totally four items (i.e., Light@room, Light@garden, Heate@office and 40A@home), in which Light@room and Light@garden can be respectively pressed down and become bright to start power supply, but, since Heate@office and 40A@home are not linked to the cloud server 2, Heate@office and 40A@home can not be pressed down to do power supply/power break operations.

Figure 6A:
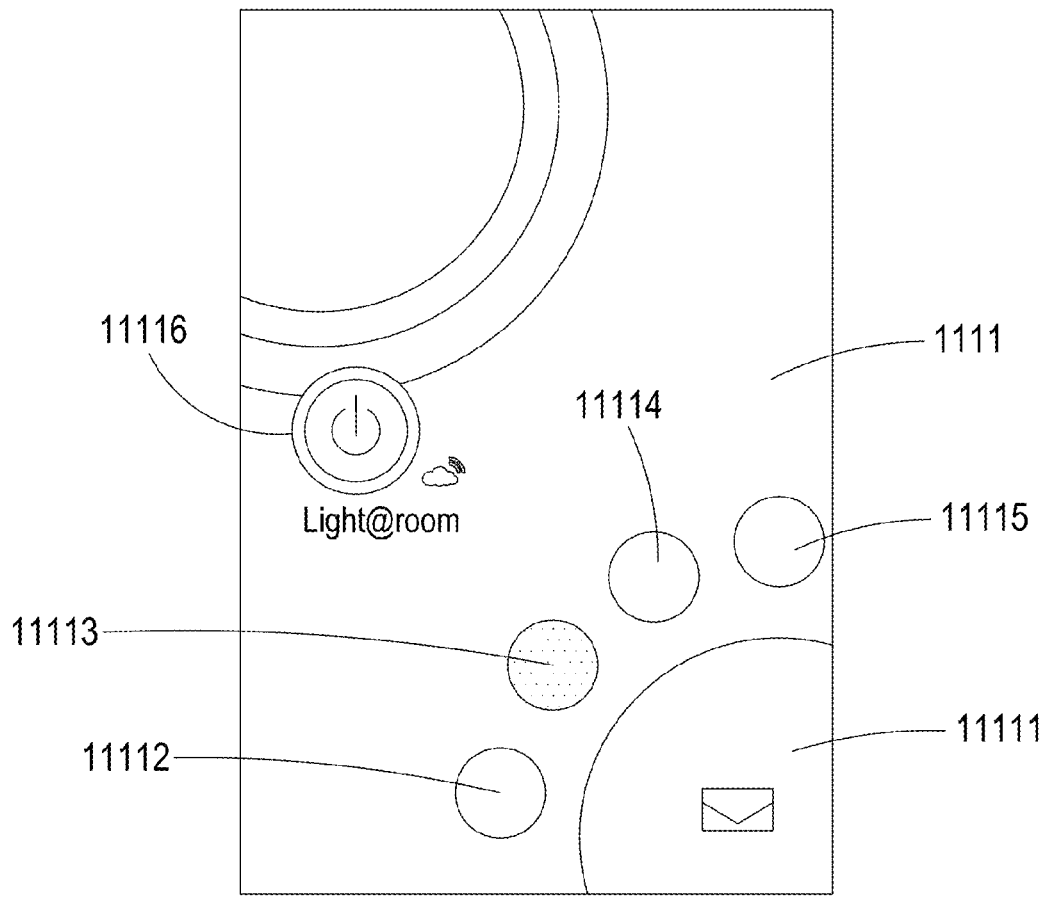
FIG. 6A shows an implementation diagram of the basic data modification for the electric power socket control system according to the present invention.
Figure 6B:
FIG. 6B shows an implementation diagram of the basic data modification for the electric power socket control system according to the present invention.

From FIG. 6A, it can be appreciated that the main page operation interface 1111 comprises an email sending module 11111, a power supply time setting module 11112, an electric power socket name modification module 11113, an electricity charge display module 11114 and a backup module 11115. After having completed this setup, suppose the user intends to change the electric power socket name, the user can press down the electric power socket name modification module 11113 to get into the modification page again. From FIG. 6B, it can be found that four names, i.e., the originally built Light@room, Light@garden, Heatet@office and 40A@home, are shown, and the user can modify each of these names. In the present embodiment, the user changes the "Light@garden" into "Fan".

Figure 7A:
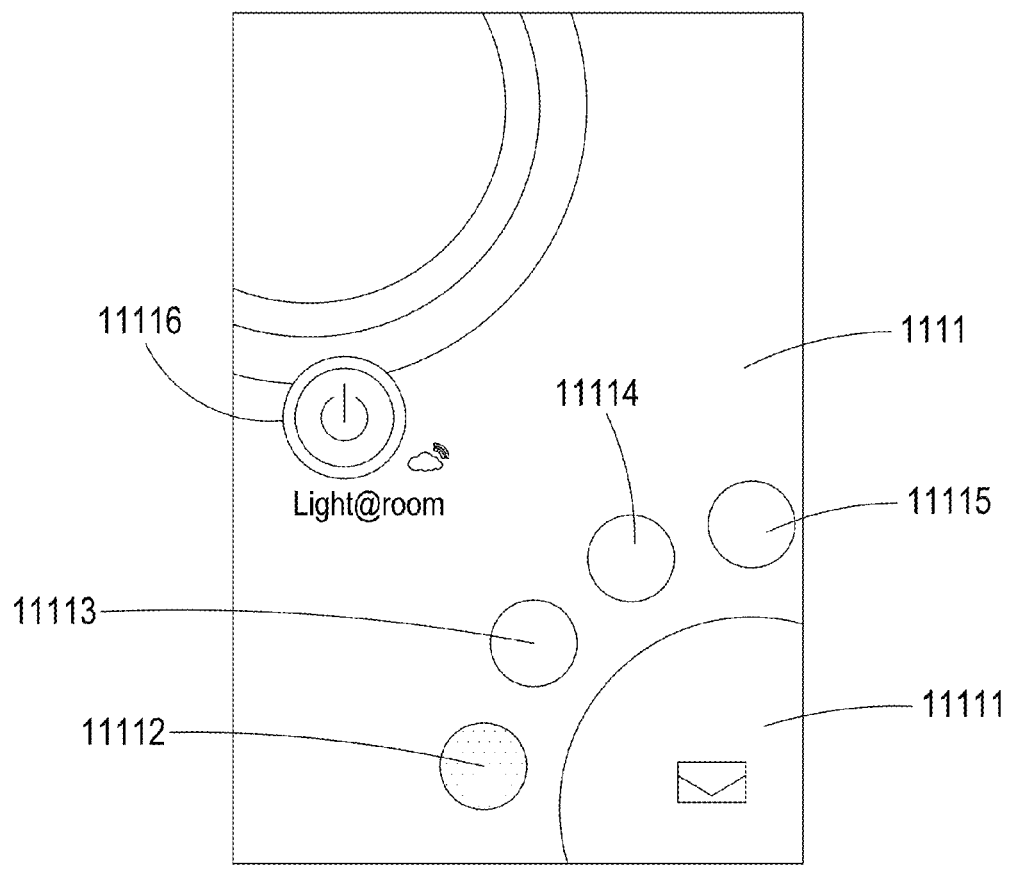
FIG. 7A shows an implementation diagram of the power supply time setting for the electric power socket control system according to the present invention.
Figure 7B:
FIG. 7B shows an implementation diagram of the power supply time setting for the electric power socket control system according to the present invention.
Figure 7C:
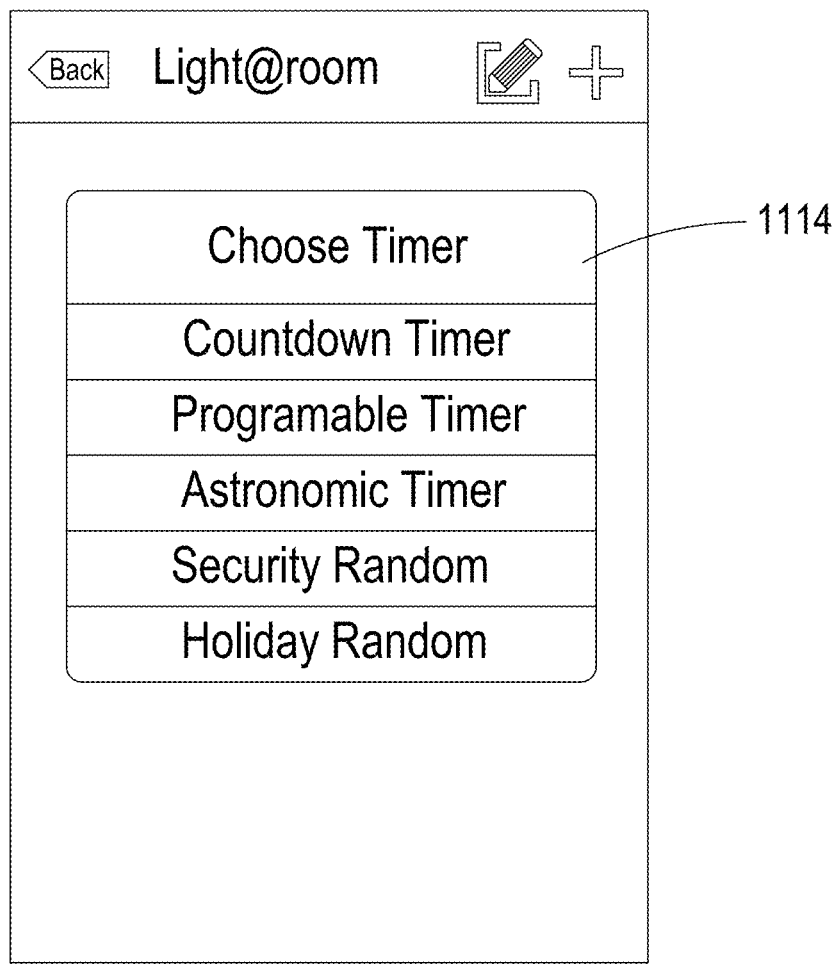
FIG. 7C shows an implementation diagram of the power supply time setting for the electric power socket control system according to the present invention.
Figure 7E:
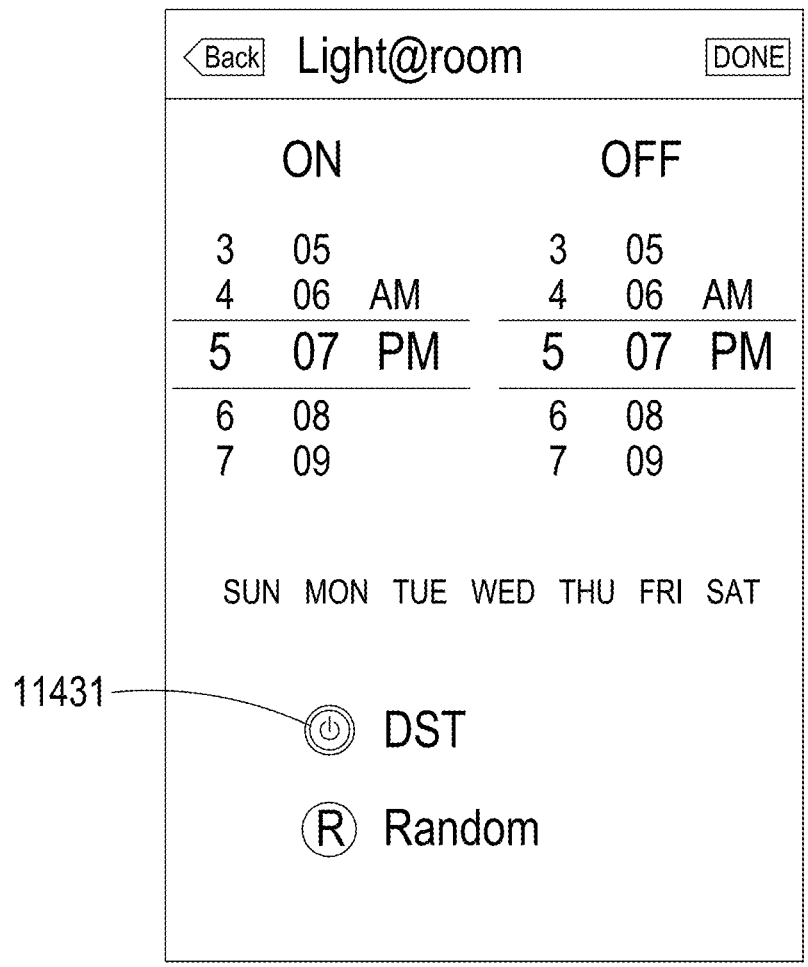
FIG. 7E shows an implementation diagram of the power supply time setting for the electric power socket control system according to the present invention.
Figure 7F:
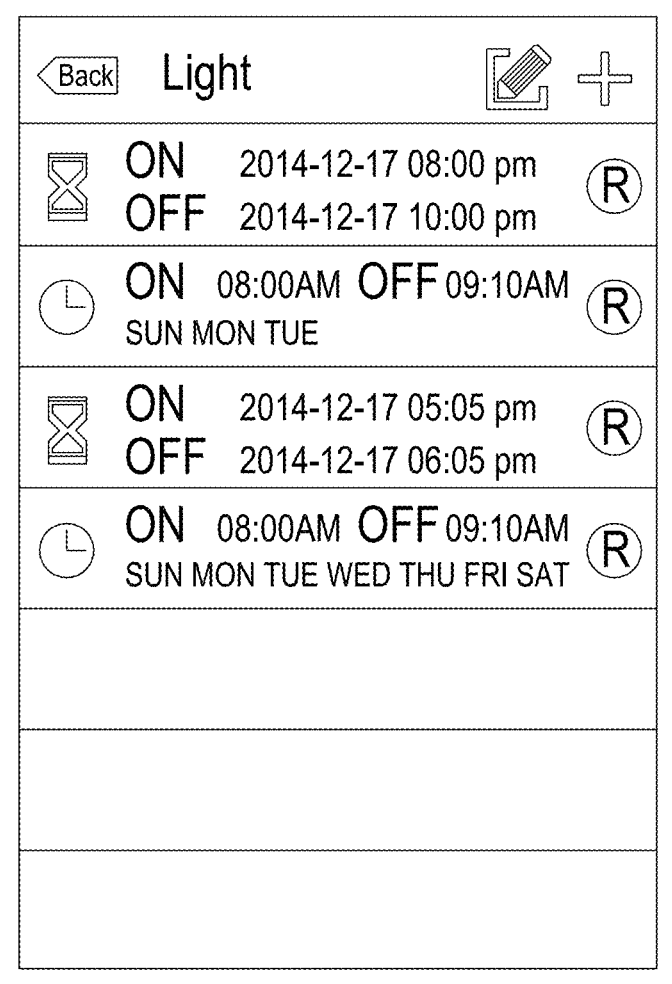

As shown in FIG. 7A, when the user presses down the power supply time setting module 11112, the electric power name selection interface 11143 will appear (four names, i.e., the configured electric power socket names Light@room, Light@garden, Heate@office and 40A@home and the like, are presented, as shown in FIG. 7B), the user may choose one of the electric power socket names for power supply setting. For example, upon choosing the "Light@room" socket name, it shows a power supply time selection interface 1114 as shown in FIG. 7C. The power supply time selection interface 1114 displays the Countdown Timer (countdown timer for power supply and power break time), Programmable Timer (regular power supply time setting), Astronomic Time (sunrise/sunset power supply and power break time), Security Random (random power supply time), Holiday Random (power supply time on holiday). If the user clicks on "Countdown Timer", an interface like FIG. 7D will appear, so the user can set up the month, day, hour and minute for the power supply or power break time; after finishing the setup, the time countdown may start and, upon reaching the countdown time, the power supply or power break operation for the remote electric power socket may be performed. On the other hand, when the user selects "Programmable Timer", as shown in FIG. 7E, the user can chooses power supply/power break time, and on the Programmable Timer interface it allows to choose DST (daylight saving time) and Random; in case the user chooses "Random", a range of 30 minutes before and after the configured time is allowable for the power supply or power break operation. Following this, as shown in FIG. 7F, the schedule for complete power supply/power break setup is listed as configuration completed.

Suppose the user chooses "Holiday Random" on the power supply time selection interface 1114, it can be seen from FIG. 7G that the user can select or input the control time interval for each day of the electric power socket device 32 and perform power supply or power break operations randomly within the control time interval. It can be understood from the Figure that the user can choose one out of the four items, "Night", "Day", "24 Hour" and "Customize"; the "Holiday Random" allows to perform power supply or power break operations randomly in a configured time (unlimited in time, random in number).

Figure 7I:
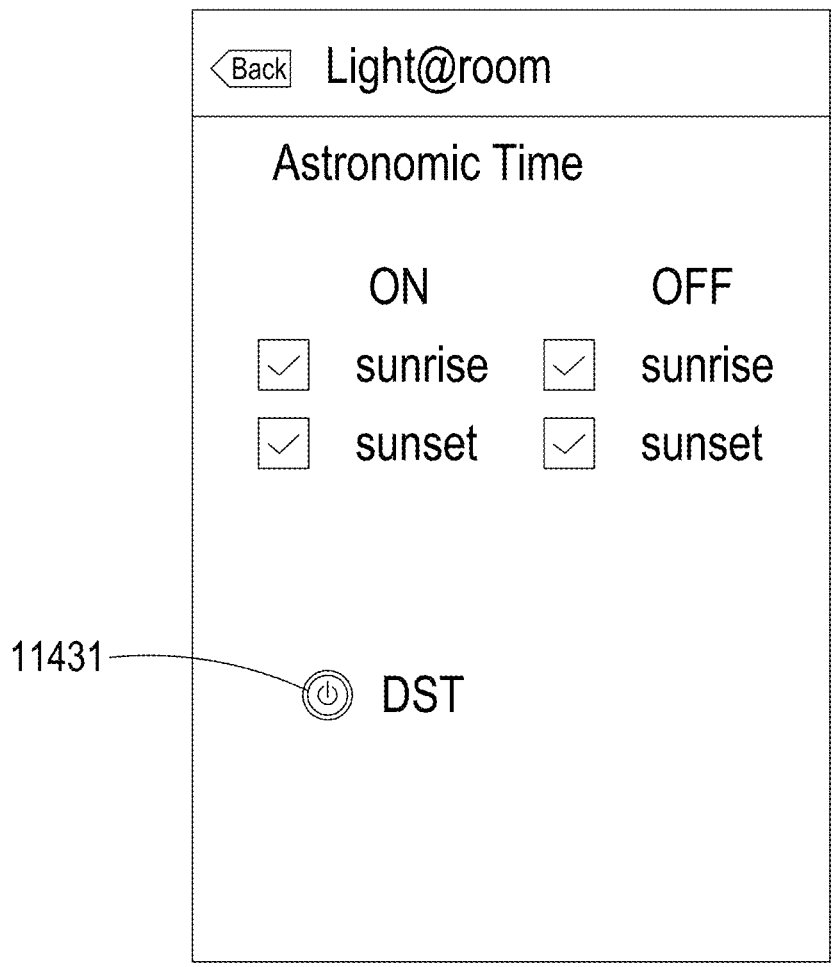
FIG. 7I shows an implementation diagram of the power supply time setting for the electric power socket control system according to the present invention.

After the user presses down the "Astronomic Time", as shown in FIG. 7I, it is possible to configure whether the sunrise/sunset power supply and power break operations of the electric power socket device 32 for each day will be performed. As set forth previously, since the inputs of the country and zip code are necessary, the cloud server 2 can adjust the power supply/power break status in accordance with sunrise/sunset time of different countries and zip codes as well as the configured contents. Besides, the daylight saving time power supply setting module 11431 can set up the power supply and power break time of the electric power socket device 32 for each day based on the daylight saving time, so it is possible to form a daylight saving time power supply start module 11431 on the sunrise/sunset power supply selection module 1143 thereby allowing to press down the daylight saving time power supply start module to initiate the settings.

If the user selects "Security Random" (random power supply time) as shown in FIG. 7G, a time setting interface will appear; after having completed the setup operation, the system can automatically and randomly repeat the power supply or power break operation within the configured time in order to achieve the objective of security.

Figure 8A:
FIG. 8A shows an implementation diagram of the electric power consumption quantity and electricity charge presentation for the electric power socket control system according to the present invention.
Figure 8B:
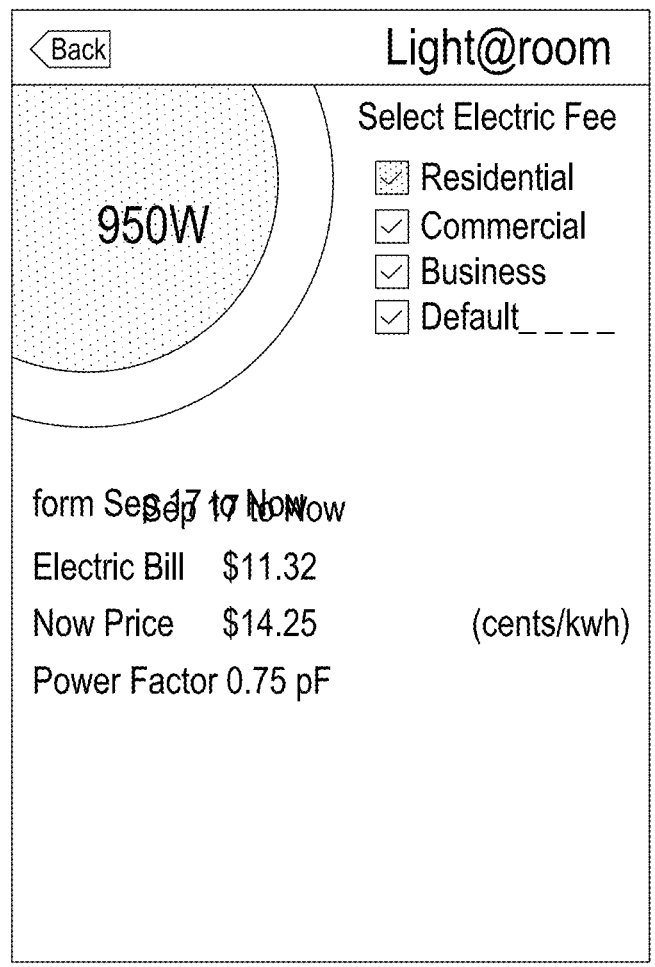
FIG. 8B shows an implementation diagram of the electric power consumption quantity and electricity charge presentation for the electric power socket control system according to the present invention.

When the user presses down the electricity charge display module 11114, as shown in FIGS. 8A, 8B and 8C, an electric power consumption quantity display interface 1116 is shown for setting up and displaying the electric power consumption data of the electric power socket device 32, in which the electric power consumption quantity display interface 1116 allows the user to first select the electricity charge collection mode (Residential, Commercial, Business or Default). Because the electric power consumption standards in different countries and area may vary, it is necessary to initially choose the electricity charge collection mode of the user, and then the cloud server 2 calculates the electricity charge amount based on the electricity charge collection standard of different countries and zip codes in conjunction with the electric power consumption quantity of the electric power socket device 32. Therefore, from FIGS. 8A, 8B and 8C, it can be observed that different electric power consumption quantities (50 W, 950 W, 1350 W) are shown on the electric power consumption quantity display interface 1116 with different colors, and such different electric power consumption quantities (50 W, 950 W, 1350 W) can be calculated to show different electricity charge amounts ($1.32, $11.32, $25.32) in accordance with different electricity charge collection standards ($0.75 cents/kwh, $14.25 cents/kwh, $20.75 cents/kwh) as well as time intervals (September 17 to Now). Besides, the cloud server 2 can calculate the power factor based on the electric power consumption status of the electric power socket device 32 and transfer it to the control software 11 of the handheld device 1 so as to be displayed on the electric power consumption quantity display interface 1116.

Figure 9:
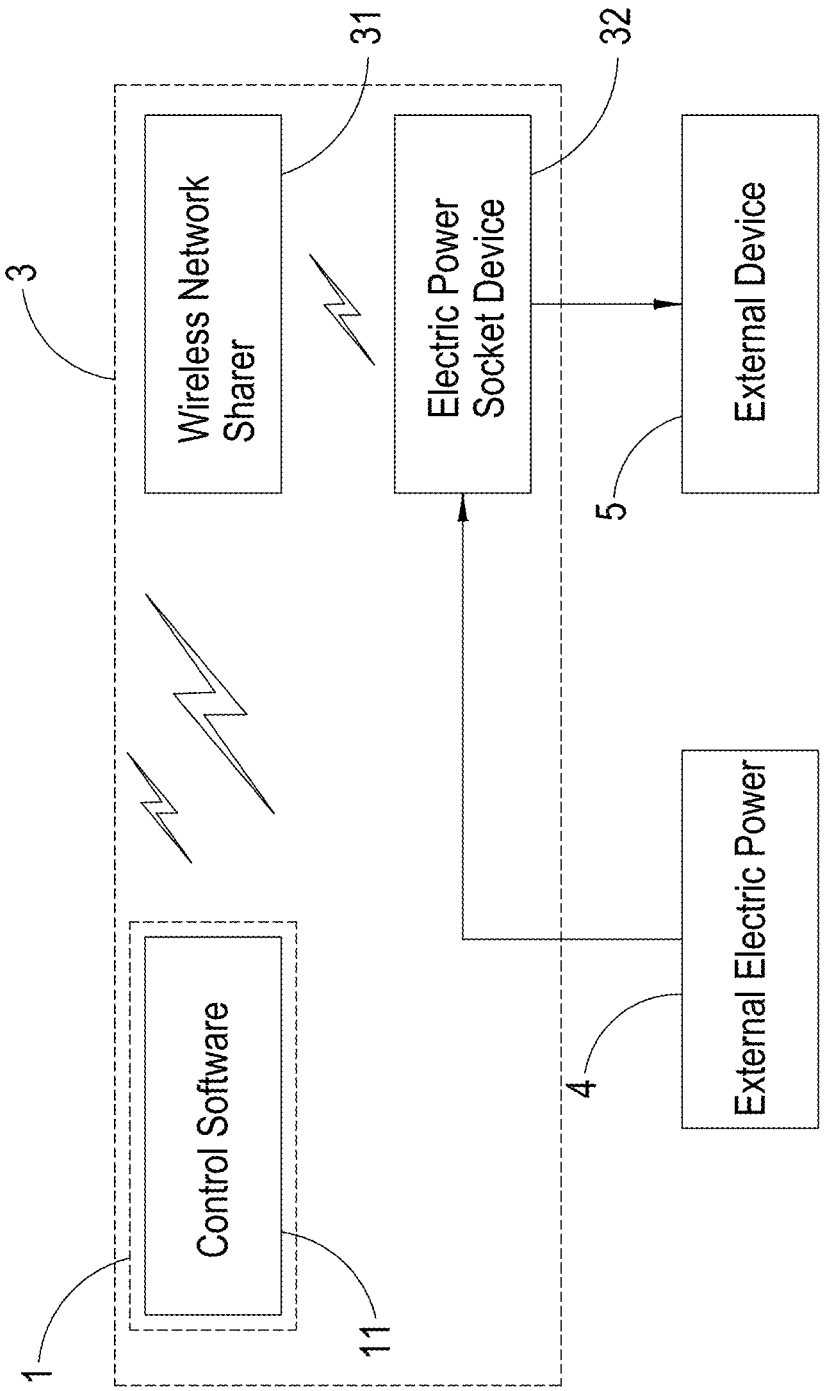
FIG. 9 shows an overall architecture diagram of another configuration for the electric power socket control system according to the present invention.

The above-said embodiment mainly describes that the handheld device 1 can remotely control the power supply/power break mechanism of the electric power socket device 32 through the cloud server 2; however, if the handheld device 1 and the electric power socket device 32 are both located indoors 3, as shown in FIG. 9, then the handheld device 1 can still control the electric power socket device 32 directly by way of the wireless network of the wireless network sharer rather than through the cloud server 2.

In comparison with other conventional technologies, the electric power socket control system according to the present invention provides the following advantages:

The present invention is able to, by means of the APP software installed on a handheld device, allow a user to perform power supply/power break operations to the electric power socket device automatically and randomly at non-fixed time within a selected time interval, and also to input the zip code of a different area so as to control the power supply/power break operations to the electric power socket device in conjunction with the data concerning that area.

Although the present invention has been disclosed through the detailed descriptions of the aforementioned embodiments, such illustrations are by no means used to restrict the present invention. Skilled ones in relevant fields of the present invention can certainly devise any applicable alternations and modifications after comprehending the aforementioned technical characteristics and embodiments of the present invention without departing from the spirit and scope thereof. Hence, the scope of the present invention to be protected under patent laws should be delineated in accordance with the claims set forth hereunder in the present specification.

What is claimed is:

1. An electric power socket control system, comprising:
a cloud server, including a built-in database module;
a wireless network sharer, used to provide a wireless network capable of connecting to external networks;
at least an electric power socket device, which includes a wireless network interface circuit and an electric quantity detection circuit, and is able to connect to the wireless network sharer by means of the wireless network interface circuit so as to connect to the cloud server through the wireless network of the wireless network sharer and receive instructions for controlling the electric power socket device via the cloud server;
a handheld device, having a build-in control software for connections to the cloud server, the control software including:
an operation interface unit, used to provide multiple user interfaces in order to operate the control software on different user interfaces;
a wireless connection unit, connected to the operation interface unit such that the control software connects to the electric power socket device on a wireless connection interface, thereby, after connection, allowing to enter into a main page operation interface to perform settings on different items;
a control mode building unit, connected to the main page operation interface and the operation interface unit, in which the control mode building unit can configure the basic data of the electric power socket device on a control mode building interface, the control mode building unit including:
a name input module, used to input a name defining the electric power socket device;
a country selection module, allowing to select the country where the electric power socket device is located;
a zip code input module, used to input the zip code of the area in the country where the electric power socket device is located;
an icon display module, capable of forming a control switch module on the main page operation interface, in which the control switch module shows the name and connection mode of the electric power socket device, and, in addition, the power supply status and electric power consumption quantity status of the electric power socket device can be uploaded to the database module of the cloud server, the power supply status of the electric power socket device can be displayed on the control switch module in real-time, and the control switch module can be pressed down so that the press-down status can be uploaded to the cloud server in order to change the power supply status of the electric power socket device in real-time;
a power supply time switch selection unit, connected to the main page operation interface and the operation interface unit, in which the power supply time switch selection unit can set up the power supply time data of the electric power socket device on a power supply time selection interface, the power supply time switch selection unit including:
a regular power supply time setting module, used to set up the power supply and power break times of the electric power socket device on any day, in which the regular power supply time setting module can form a regular power supply start module on the power supply time selection interface so that the regular power supply start module can be pressed down in order to initiate setting operations;
a random power supply time setting module, used to select or input the control time interval of the electric power socket device for each day and perform random power supply or power break operations within the control time interval, in which the random power supply time selection module can form a random power supply start module on the power supply time selection interface so that the random power supply start module can be pressed down in order to initiate setting operations;
a sunrise/sunset power supply selection module, used to configure whether to perform power supply/power break operations of the electric power socket device in each day;
a data upload unit, connected to the control mode building unit, the power supply time switch selection unit and the sunrise/sunset power selection unit, and used to upload the basic data, power supply time data and the sunrise/sunset power supply data of the electric power socket device to the database module of the cloud server and
generate a data file with the basic data of the electric power socket device such that the power supply status and the electric power consumption quantity status uploaded by the electric power socket device can be stored in the data file;
an electric power consumption quantity display unit, connected to the main page operation interface and the operation interface unit and capable of configuring and displaying the electric power consumption data of the electric power socket device on an electric power consumption quantity display interface, the electric power consumption quantity display unit including:
an electricity charge collection method setting module, used to configure the electricity charge collection mode for the electric power socket device;
an electricity charge collection time setting module, used to configure the time range of the electricity charge collection for the electric power socket device;
a real-time electric power consumption quantity display module, capable of accessing the electric power consumption quantity status of the electric power socket device from the database module of the cloud server and displaying the electric power consumption quantity on the electric power consumption quantity display interface with different colors in accordance with the electric power consumption quantity data;
a real-time electricity charge display module, capable of calculating the electricity charge amount in accordance with the electric power consumption quantity status, the electricity charge collection mode and the time range for electricity charge collection, and displaying the amount on the electric power consumption quantity display interface.

2. The electric power socket control system according to claim 1, wherein the connection mode between the control software in the handheld device and the electric power socket device is of a remote control mode and a direct control mode, in which the remote control mode indicates that the handheld device needs to transfer power supply/power break instructions to the electric power socket device through the cloud server, and the direct control mode means the handheld device transfers power supply/power break instructions to the electric power socket device directly by way of the wireless network.

3. The electric power socket control system according to claim 1, wherein if the electric power socket device is connected to the cloud server, then the control switch module of the electric power socket device can be displayed on the main page operation interface, and if the electric power socket device is not connected to the cloud server, then the control switch module can not be pressed down to control power supply/power break operations to the electric power socket device.

4. The electric power socket control system according to claim 1, wherein the control software can configure with respect to different electric power socket devices and generate different control switch modules, and different control switch modules displayed on the main page operation interface can be shown with sliding and moving actions.

5. The electric power socket control system according to claim 1, wherein the database module of the cloud server further comprises the sunrise/sunset standard data corresponding to different counties and zip codes such that the cloud server can calculate based on the configured sunrise/sunset power supply data in conjunction with the sunrise/sunset standard data and transfers power supply/power break instructions to the electric power socket device.

6. The electric power socket control system according to claim 1, wherein the database module of the cloud server further comprises the electricity charge standard data corresponding to different counties and zip codes such that the cloud server can calculate the electricity charge amount based on the configured electric power consumption data in conjunction with the electricity charge standard data and transfer it to the control software of the handheld device thereby displaying the electric power consumption quantity power supply/power break instructions on the electric power consumption quantity display interface.

7. The electric power socket control system according to claim 1, further comprising an electric power socket name modification unit which is connected to the main page operation interface and the operation interface unit and is used to modify the contents of the configured basic data.

8. The electric power socket control system according to claim 1, wherein the sunrise/sunset power supply selection module further includes a daylight saving time power supply setting module, in which the daylight saving time power supply setting module sets up the power supply/power break time of the electric power socket device in each day based on the daylight saving time, and the daylight saving time power supply setting module can form a daylight saving time power supply start module on the sunrise/sunset power supply selection interface so the daylight saving time power supply start module can be pressed down to initiate setting operations.

9. The electric power socket control system according to claim 1, wherein the cloud server can calculate the power factor based on the electric power consumption status of the electric power socket device and transfer it to the control software of the handheld device so as to be displayed on the electric power consumption quantity display interface.

10. The electric power socket control system according to claim 1, wherein the regular power supply time setting module further comprises: interfaces including: a Countdown Timer (countdown timer for power supply and power break time), a Programmable Timer (regular power supply time setting), an Astronomic Time (sunrise/sunset power supply and power break time), and a Holiday Random (power supply time on holiday).

* * * * *